United States Patent
Arao et al.

(10) Patent No.: US 12,339,496 B2
(45) Date of Patent: Jun. 24, 2025

(54) OPTICAL WAVEGUIDE DEVICE AND OPTICAL COMMUNICATION SYSTEM INCLUDING SAME

(71) Applicant: SUMITOMO ELECTRIC INDUSTRIES, LTD., Osaka (JP)

(72) Inventors: Yuki Arao, Osaka (JP); Tetsuya Hayashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 147 days.

(21) Appl. No.: 17/800,113

(22) PCT Filed: Mar. 3, 2021

(86) PCT No.: PCT/JP2021/008246
§ 371 (c)(1),
(2) Date: Aug. 16, 2022

(87) PCT Pub. No.: WO2021/177367
PCT Pub. Date: Sep. 10, 2021

(65) Prior Publication Data
US 2023/0106774 A1    Apr. 6, 2023

(30) Foreign Application Priority Data

Mar. 6, 2020  (JP) ................................ 2020-038906

(51) Int. Cl.
*G02B 6/125*    (2006.01)
*G02B 6/26*    (2006.01)
(Continued)

(52) U.S. Cl.
CPC .............. *G02B 6/125* (2013.01); *G02B 6/26* (2013.01); *G02B 6/44715* (2023.05); *G01D 5/3538* (2013.01); *G02B 6/02042* (2013.01)

(58) Field of Classification Search
CPC .......... G02B 6/125; G02B 6/26; G02B 6/262; G02B 6/264; G02B 6/44715; G02B 6/4472; G02B 6/02042
See application file for complete search history.

(56) References Cited

U.S. PATENT DOCUMENTS

| | | |
|---|---|---|
| 2005/0069258 A1 | 3/2005 | Zheng et al. |
| 2012/0092651 A1 | 4/2012 | Molin et al. |

(Continued)

FOREIGN PATENT DOCUMENTS

| | | |
|---|---|---|
| CN | 107771292 A | 3/2018 |
| JP | H11-052158 A | 2/1999 |

(Continued)

OTHER PUBLICATIONS

Extended European search report in application 21765504.2, dated Jul. 12, 2023 (9 pages) (Year: 2023).*

(Continued)

*Primary Examiner* — Michael Stahl
(74) *Attorney, Agent, or Firm* — Oliff PLC

(57) ABSTRACT

An optical waveguide device that enables single-mode coupling between cores to be coupled by controlling optical signal intensity variation due to an MPI. The optical waveguide device includes a first device end surface, a second device end surface, a waveguide, and a cladding layer. The waveguide has a first waveguide end surface and a second waveguide end surface, and light beams of a plurality of modes having different orders are guided. Further, the waveguide has one or more bent portions. The cladding layer has a refractive index lower than a refractive index of the waveguide. The waveguide has a waveguide length L of $5\times10^6$ [nm] or more and $100\times10^6$ [nm] or less, and has a structure in which an inter-mode group delay time difference $\Delta\beta1$ satisfies a condition given by $|\Delta\beta1|\leq\frac{1}{2}\times10^{-12}$ [s]/L.

6 Claims, 4 Drawing Sheets

(51) Int. Cl.
  *G02B 6/44* (2006.01)
  *G01D 5/353* (2006.01)
  *G02B 6/02* (2006.01)

(56) References Cited

U.S. PATENT DOCUMENTS

| | | | |
|---|---|---|---|
| 2012/0105831 A1 | 5/2012 | Nicholson et al. | |
| 2013/0071115 A1 | 3/2013 | Bennett et al. | |
| 2013/0230290 A1* | 9/2013 | Evans | G02B 6/02019 |
| | | | 385/124 |
| 2014/0153922 A1* | 6/2014 | Ryf | H04B 10/50 |
| | | | 398/44 |
| 2017/0160466 A1 | 6/2017 | Mamura et al. | |
| 2018/0120503 A1 | 5/2018 | Bennett et al. | |
| 2019/0033512 A1 | 1/2019 | Jemura et al. | |
| 2019/0346629 A1* | 11/2019 | Morishima | G02B 6/3885 |
| 2020/0124817 A1* | 4/2020 | Ohmori | G02B 6/4471 |
| 2020/0379187 A1* | 12/2020 | Matsui | G02B 6/125 |
| 2021/0263213 A1 | 8/2021 | Sakamoto et al. | |
| 2022/0244451 A1* | 8/2022 | Horiguchi | G02B 6/125 |

FOREIGN PATENT DOCUMENTS

| | | |
|---|---|---|
| JP | 2012-098722 A | 5/2012 |
| JP | 2014-509411 A | 4/2014 |
| JP | 2014-178628 A | 9/2014 |
| JP | 2014-522997 A | 9/2014 |
| JP | 2014-530374 A | 11/2014 |
| JP | 2015-529848 A | 10/2015 |
| JP | 2019-537055 A | 12/2019 |
| JP | 2020-013036 A | 1/2020 |
| WO | 2012/161809 A1 | 11/2012 |
| WO | 2012/161810 A1 | 11/2012 |
| WO | 2012/177808 A1 | 12/2012 |
| WO | 2013/039751 A1 | 3/2013 |
| WO | 2014/021894 A2 | 2/2014 |
| WO | 2016/137344 A1 | 9/2016 |
| WO | 2018/081076 A1 | 5/2018 |
| WO | 2018/135411 A1 | 7/2018 |

OTHER PUBLICATIONS

May 18, 2021 International Search Report issued in International Patent Application No. PCT/JP2021/008246.

* cited by examiner

OPTICAL WAVEGUIDE DEVICE AND OPTICAL COMMUNICATION SYSTEM INCLUDING SAME

TECHNICAL FIELD

The present disclosure relates to an optical waveguide device and an optical communication system including the same.

This application claims priority from Japanese Patent Application No. 2020-038906 filed on Mar. 6, 2020, the content of which is relied upon and incorporated herein by reference in its entirety.

BACKGROUND ART

As one of optical waveguide devices, for example, as disclosed in Patent Document 1 and Patent Document 2, a fan-in/fan-out (FIFO) device that converts a pitch of a plurality of aligned waveguides (cores) along a light propagation direction is known. By using such a FIFO device, it is possible to couple each core of a combination having different core pitches, for example, a plurality of single-core optical fibers (hereinafter, referred to as "SCF") disposed in parallel on the same plane and a corresponding core of a multi-core optical fiber (hereinafter, referred to as "MCF") with a low loss.

Note that Patent Document 1 discloses a FIFO device having a three-dimensional waveguide structure and a mode field diameter (hereinafter, referred to as "MFD") conversion function. In addition, Patent Document 2 discloses a configuration in which a coupling loss between cores to be coupled is suppressed by a lens.

CITATION LIST

Patent Literature

Patent Document 1: International Publication No. WO 2018-135411
Patent Document 2: Japanese Patent Application Laid-Open No. 2014-178628

SUMMARY OF INVENTION

Technical Problem

Solution to Problem

An optical waveguide device of the present disclosure includes a first device end surface, a second device end surface opposing the first device end surface, a waveguide, and a cladding layer. The waveguide has a first waveguide end surface that matches the first device end surface and a second waveguide end surface that matches the second device end surface, and guides light beams of a plurality of modes having different orders. In addition, the waveguide has one or more bent portions on an optical path from the first waveguide end surface to the second waveguide end surface. The waveguide is provided inside or on a surface of the cladding layer. The cladding layer has a refractive index lower than a refractive index of the waveguide. In particular, the waveguide has a waveguide length L of $5 \times 10^6$ [nm] or more and $100 \times 10^6$ [nm] or less, and has a structure in which a group delay time difference (DMD: Differential Mode Delay, hereinafter referred to as "inter-mode group delay time difference") $\Delta\beta 1$ between the plurality of modes satisfies a condition given by the following formula:

$$|\Delta\beta 1| \leq \tfrac{1}{2} \times 10^{-12} \, [s]/L.$$

DESCRIPTION OF EMBODIMENTS

Figure 1:
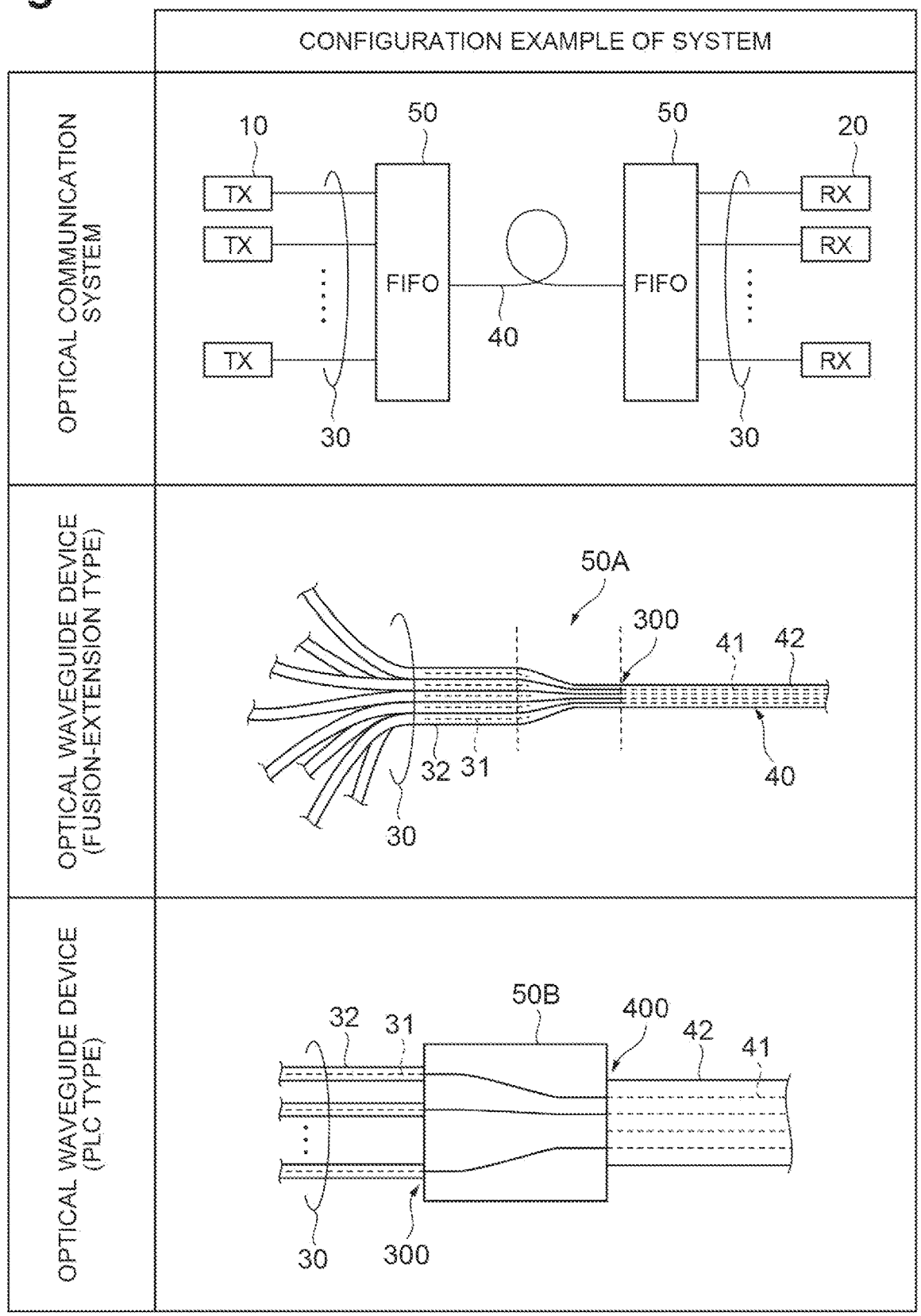
FIG. 1 is a diagram for describing a configuration example (system configuration) of an optical communication system of the present disclosure.

An object of the present disclosure is to provide an optical waveguide device and an optical communication system including the same that enable single-mode coupling between cores between a pair of optical fibers to be coupled by controlling an optical signal intensity variation due to a problem that is unavoidable in a structure of a conventional FIFO device, that is, interference (multipass interference, hereinafter referred to as "MPI") between a low-order mode and a high-order mode within a frequency band necessary at the time of signal modulation in optical signal transmission.

Advantageous Effects of Invention

According to the optical waveguide device of the present disclosure, it is possible to control an optical signal intensity variation due to an MPI in a frequency band necessary at the time of signal modulation in optical signal transmission, and as a result, it is possible to perform single-mode coupling between cores between a pair of optical fibers to be coupled.

First, structural features required for the optical waveguide device such as the FIFO device will be described.

In the FIFO device, since a pitch of a plurality of aligned cores (waveguides) is converted along a light propagation direction, each core usually has a bent structure. Therefore, a bending loss occurs while light propagates through the core in the FIFO device. Therefore, in order to couple a pair of optical fibers (substantially between cores corresponding to each other on a one-to-one basis) with a low loss, it is necessary to suppress the bending loss. In addition, in the FIFO device, a minimum pitch between adjacent cores is 50 µm or less, and an increase in crosstalk between the adjacent cores becomes a noise factor in the optical signal transmission. Therefore, it is also necessary to suppress the crosstalk.

Considering the suppression of the bending loss and the crosstalk described above, it is effective to increase a relative refractive index difference (for example, the relative refractive index difference of the core with respect to the refractive index of the cladding at a wavelength of 589 [nm]) between the core and the cladding in the FIFO device to enhance optical confinement in the core. However, the increase in the relative refractive index difference $\Delta$ of the core causes a decrease in the MFD (mode field diameter) of the FIFO device and increases a coupling loss with a single-mode optical fiber (SMF). Therefore, in the FIFO device, it is necessary to enlarge a core width (or a core diameter) as the relative refractive index difference Δ of the core increases.

However, in a case where the relative refractive index difference Δ of the core is increased and the core width is enlarged, not only a fundamental mode to be guided but also a high-order mode not to be guided can be guided. In the optical signal transmission, this high-order mode light propagation generally becomes a problem. That is, in the optical waveguide device such as the FIFO device for single-mode transmission, occurrence of interference (MPI) between the fundamental mode and the high-order mode becomes a problem in a case of a structure in which the high-order mode can be guided.

Therefore, the waveguide device of the present disclosure does not actively exclude the above-described MPI, but controls to reduce the optical signal intensity variation due to the MPI in the frequency band necessary for the signal modulation, thereby ensuring the single-mode coupling between the pair of optical fibers to be coupled.

Description of Embodiment of Present Disclosure

First, contents of the embodiments of the present disclosure will be individually listed and described.

(1) The optical waveguide device of the present disclosure is an optical device for single-mode transmission for an optical signal having a wavelength λ0 modulated at a modulation rate defined by any frequency of $25 \times 10^9$ [Hz] or more and $1000 \times 10^9$ [Hz] or less. Specifically, as one aspect, the optical waveguide device includes a first device end surface, a second device end surface opposing the first device end surface, a waveguide, and a cladding layer. The waveguide has a first waveguide end surface that matches the first device end surface and a second waveguide end surface that matches the second device end surface, and guides light beams of a plurality of modes having different orders. In addition, the waveguide has one or more bent portions on an optical path from the first waveguide end surface to the second waveguide end surface. The waveguide is provided inside or on a surface of the cladding layer. The cladding layer has a refractive index lower than a refractive index of the waveguide. In particular, the waveguide has a waveguide length L of $5 \times 10^6$ [nm] or more and $100 \times 10^6$ [nm] or less, and a structure satisfying a condition given by the following formula:

$$|\Delta\beta1| \leq 1/(N \cdot 2\Delta f \cdot L).$$

Note that the waveguide length L is defined by an optical path length from the first waveguide end surface to the second waveguide end surface. In the above formula, a parameter "Δβ1" is an inter-mode group delay time difference. A parameter "N" is an integer value that divides a vibration period Tf of the optical signal intensity variation due to the MPI between the plurality of modes with respect to an optical frequency, and is a division number defined by any integer of 10 or more and 100 or less. A parameter "Δf" is a modulation rate defined by any frequency (for example, Δf=25 [GHz] corresponds to 25 [GBaud]) of $25 \times 10^9$ [Hz] or more and $1000 \times 10^9$ [Hz] or less.

(2) As one aspect of the present disclosure, the bent portion preferably has a curvature radius r of 40 mm or less. The optical waveguide device is applicable to the Fan-In Fan Out (FIFO) device, and enables optical coupling between optical fibers having different core pitches. However, the waveguide length L is preferably $5 \times 10^6$ [nm] or more so that the bending loss does not become too large (so that the curvature radius r does not become too small). On the other hand, in order to ensure ease of handling of the device, the waveguide length L is preferably $100 \times 10^6$ [nm] or less.

(3) As one aspect, an optical communication system of the present disclosure includes at least a pair of optical fibers and an optical waveguide device (optical waveguide device of the present disclosure) provided between the pair of optical fibers and having the above-described structure. By applying the optical waveguide device having the above-described structure, the cores of the pair of optical fibers can be single-mode coupled to each other.

(4) As one aspect of the present disclosure, in the optical communication system, each of the pair of optical fibers disposed so as to sandwich the optical waveguide device therebetween preferably includes a single-core optical fiber (hereinafter, referred to as "SCF") or a multi-core optical fiber (hereinafter, referred to as "MCF"). In particular, when one of the pair of optical fibers includes the MCF, it is possible to efficiently use a wiring space in a base station or the like.

As described above, each aspect listed in the section of [Description of Embodiment of Present Disclosure] is applicable to each of all the remaining aspects or to all the combinations of these remaining aspects.

Details of Embodiments of Present Disclosure

Hereinafter, specific structures of the optical waveguide device and the optical communication system according to the embodiment of the present disclosure will be described in detail with reference to the accompanying drawings. Note that the present invention is not limited to these examples, but is indicated by the claims, and is intended to include meanings equivalent to the claims and all modifications within the scope. In the description of the drawings, the same elements are denoted by the same reference numerals, and redundant description is omitted.

FIG. 1 is a diagram for describing a configuration example (system configuration) of the optical communication system of the present disclosure. An upper part of FIG. 1 illustrates a general configuration example of the optical communication system of the present disclosure. In a middle part of FIG. 1, a configuration example of a fusion-extension type optical waveguide device 50A applicable as the FIFO device of the optical communication system is illustrated. In addition, a lower part of FIG. 1 illustrates a configuration example of a planar lightwave circuit (PLC) type optical waveguide device 50B applicable as the FIFO device of the optical communication system. Note that the FIFO device of the optical communication system of the present disclosure may be an optical waveguide device in which optical circuits are three-dimensionally disposed.

The optical communication system includes a plurality of optical transmitters (hereinafter, referred to as "TX") 10, a plurality of optical receivers (hereinafter, referred to as "RX") 20, an MCF (multi-core optical fiber) 40, a pair of FIFO devices 50 (a FIFO device located between the plurality of TXs 10 and the MCF 40 is referred to as an "input-side FIFO device", and a FIFO device located between the MCF 40 and the plurality of RXs 20 is referred to as an "output-side FIFO device"), and a plurality of SCFs (single-core optical fibers) 30 disposed both between the plurality of TXs 10 and the input-side FIFO device and between the output-side FIFO device and the plurality of RXs 20. The TX 10 performs modulation on an optical signal having a wavelength of 1310 [nm], 1550 [nm], or the like, for example, at any modulation rate Δf (for example, $25 \times 10^9$ [Hz], $50 \times 10^9$ [Hz], $100 \times 10^9$ [Hz], $200 \times 10^9$ [Hz], 500×10⁹ [Hz], 1000×10⁹ [Hz], and the like) of 25×10⁹ [Hz] or more and 1000×10⁹ [Hz] or less.

Among the plurality of SCFs 30, the SCFs 30 respectively corresponding to the plurality of TXs 10 are disposed between the plurality of TXs 10 and the input-side FIFO device, and the SCFs 30 respectively corresponding to the plurality of RXs 20 are disposed between the plurality of RXs 20 and the output-side FIFO device. Each of the plurality of TXs 10 outputs an optical signal, and each of the plurality of RXs 20 receives the optical signal from each of the plurality of TXs 10. Therefore, the plurality of SCFs 30 function as a waveguide for individually propagating the optical signals from the plurality of TXs 10 to the input-side FIFO device, or as a waveguide for individually propagating the optical signals from the output-side FIFO device to the plurality of RXs 20. Each of the plurality of SCFs 30 includes a single-core extending along a central axis and a cladding surrounding the single core.

The MCF 40 provided between the pair of FIFO devices 50 (the input-side FIFO device and the output-side FIFO device) has a plurality of cores extending along the central axis and a common cladding surrounding each of the plurality of cores. In addition, each of the pair of FIFO devices 50 is an optical device that single-mode couples the cores of the plurality of SCFs 30 to the corresponding cores among the plurality of cores of the MCF 40, and the waveguide pitch (core pitch) is converted along the light propagation direction.

For example, the optical waveguide device 50A illustrated in the middle part of FIG. 1 is applicable to the pair of FIFO devices 50. The optical waveguide device 50A has a structure in which distal end portions of the plurality of SCFs 30 each having the core 31 and the cladding 32 are fused in a bundled state, and an arrangement (pitch) of the cores on an end surface 300 of the fused distal end portion is extended so as to match an arrangement (pitch) of the cores in the MCF 40. The MCF 40 also has a plurality of cores 41 and a common cladding 42, and each core 41 of the MCF 40 and each core 31 of the plurality of SCFs 30 are optically coupled (for example, fused and coupled) on the end surface of the optical waveguide device 50A (substantially the end surface 300 of the SCF 30). In the core 31 of the SCF 30 located in the periphery in the cross section of the fused portion among the plurality of SCFs 30 configuring the optical waveguide device 50A, a bent portion having a curvature radius r smaller than that of the bent portion provided in the core of the SCF 30 located in the center in the cross section of the fused portion is formed. In the optical waveguide device 50A, each core 31 is integrally surrounded by the cladding 32 of the SCF 30. Note that, in the case of the optical waveguide device 50A, the position where the pitch of the adjacent cores 31 starts to change in the fused portion of the SCF 30 corresponds to the first device end surface, and the position of the end surface 300 of the SCF 30 corresponds to the second device end surface. The waveguide length L of the optical waveguide device 50A is preferably 10 to 100 mm in order to suppress an excessive loss due to a rapid core diameter variation in an extended portion. An upper limit of the waveguide length may be 80×10⁶ [nm], 60×10⁶ [nm], 40×10⁶ [nm], or 20×10⁶ [nm].

In addition, the PLC type optical waveguide device 50B illustrated in the lower part of FIG. 1 is also applicable to the pair of FIFO devices 50. The optical waveguide device 50B has a first device end surface to which the end surface 300 of each SCF 30 having the core 31 and the cladding 32 is fixed, and a second device end surface to which an end surface 400 of the MCF 40 is fixed. An in-device core (waveguide in the optical waveguide device 50B) for single-mode coupling the core 31 of each SCF 30 to the corresponding core 41 of the MCF 40 is formed between the first device end surface and the second device end surface in the vicinity of or inside the surface of the cladding layer. The cross-sectional shape of the in-device core may be any of a circular shape, a semicircular shape, and a rectangular shape. In particular, in a case where the in-device core is a rectangular waveguide having a rectangular cross section, as an example, after the rectangular waveguide is formed on an underlying layer of the cladding layer, the upper layer of the cladding layer is provided so as to cover the rectangular waveguide. The waveguide length L of the optical waveguide device 50B is preferably 5 to 20 mm from the viewpoint of ease of handling.

Figure 2:
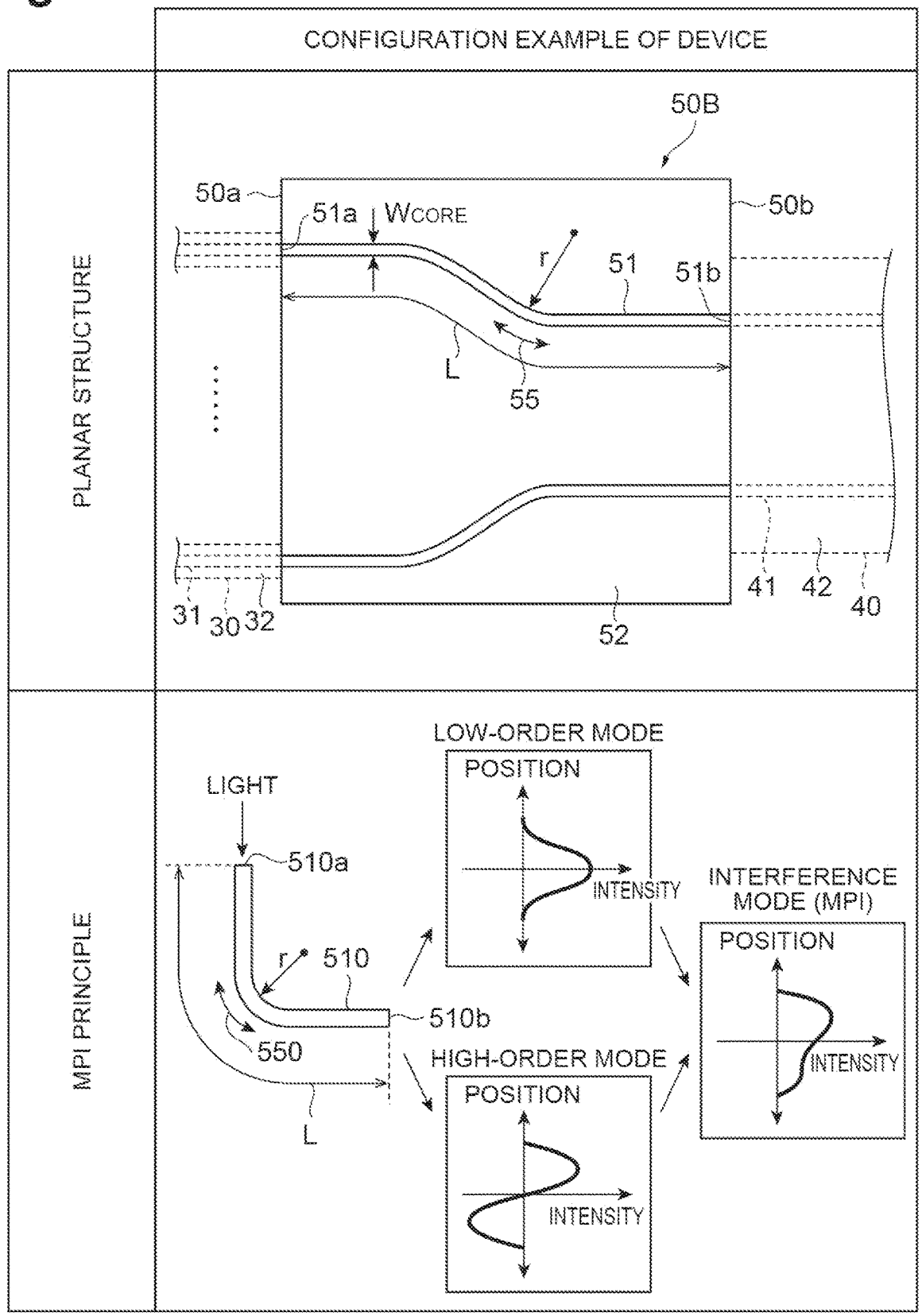
FIG. 2 is a diagram for describing a configuration example (device configuration) of an optical waveguide device of the present disclosure.

FIG. 2 is a diagram for describing an example of the PLC type optical waveguide device 50B in detail as a configuration example (device configuration) of the optical waveguide device of the present disclosure.

The PLC type optical waveguide device 50B illustrated in the upper part of FIG. 2 has a first device end surface 50a to which the end surface 300 (see the lower part of FIG. 1) of the SCF 30 each having the core 31 and the cladding 32 is fixed, and a second device end surface 50b to which the end surface 400 (see the lower part of FIG. 1) of the MCF 40 is fixed. Between the first device end surface 50a and the second device end surface 50b, a core (waveguide) 51 for single-mode coupling each core 31 of the SCF 30 to the corresponding core 41 of the MCF 40 is formed in the vicinity of or inside the surface of the cladding layer 52. The first end surface (first waveguide end surface) 51a of the core 51 matches the first device end surface 50a, and the second end surface (second waveguide end surface) 51b of the core 51 matches the second device end surface 50b. The core 51 has at least one bent portion 55 provided between the first end surface 51a and the second end surface 51b, and the bent portion 55 has a curvature radius r of 40 mm or less. The relative refractive index difference of the core 51 with respect to the cladding layer 52 and the width of the core 51 are appropriately determined in accordance with the SCF 30 and the MCF 40. A lower limit of the relative refractive index difference of the core 51 with respect to the cladding layer 52 is, for example, 0.25%, 0.30%, or 0.35%. An upper limit is, for example, 0.6%, 0.7%, or 0.8%. A lower limit of the width of the core 51 is, for example, 6.5 μm, 7.0 μm, or 7.5 μm. An upper limit is, for example, 8.0 μm, 8.5 μm, or 9.0 μm. With this configuration, light beams of a plurality of modes having different orders are guided through the core 51. The waveguide length L of the core 51 is preferably 5×10⁶ [nm] or more so that the bending loss does not become too large (so that the curvature radius r does not become too small). On the other hand, in order to ensure ease of handling of the device, the waveguide length L is preferably 20×10⁶ [nm] or less.

When the core 51 is formed on the surface of the cladding layer 52, the core 51 has a semicircular or rectangular cross section. When the core 51 is formed in the cladding layer 52, the core 51 has a circular or a rectangular cross section. In either case, the width of the core 51 is given as a maximum width along a direction orthogonal to a longitudinal direction of the core 51 in a planar figure obtained by projecting the core 51 on the surface of the cladding layer 52. In addition, in a case where the core 51 is provided in the cladding layer 52, the core 51 and an upper layer (over cladding) may be sequentially stacked in order on the underlying layer (under cladding), or the cladding layer 52 may be irradiated with laser light and drawn in the cladding layer 52.

As illustrated in the lower part of FIG. 2, generally, when light having a predetermined wavelength is inputted from one end surface 510a of a waveguide 510 provided with a bent portion 550 having the curvature radius r, light in a low-order mode and light in a high-order mode are generated in a process in which the input light propagates by the waveguide length L toward the other end surface 510b. At this time, the MPI occurs between the low-order mode and the high-order mode of light propagating in the core 51. The occurrence of the MPI becomes a problem at the time of signal modulation in the optical signal transmission (optical signal intensity variation due to the MPT occurs within frequency band necessary at the time of signal modulation). Therefore, the optical waveguide device (corresponding to the pair of FIFO devices 50) of the present disclosure is designed to enable single-mode coupling between a pair of optical fibers of which the cores are optically coupled to each other.

Figure 3:
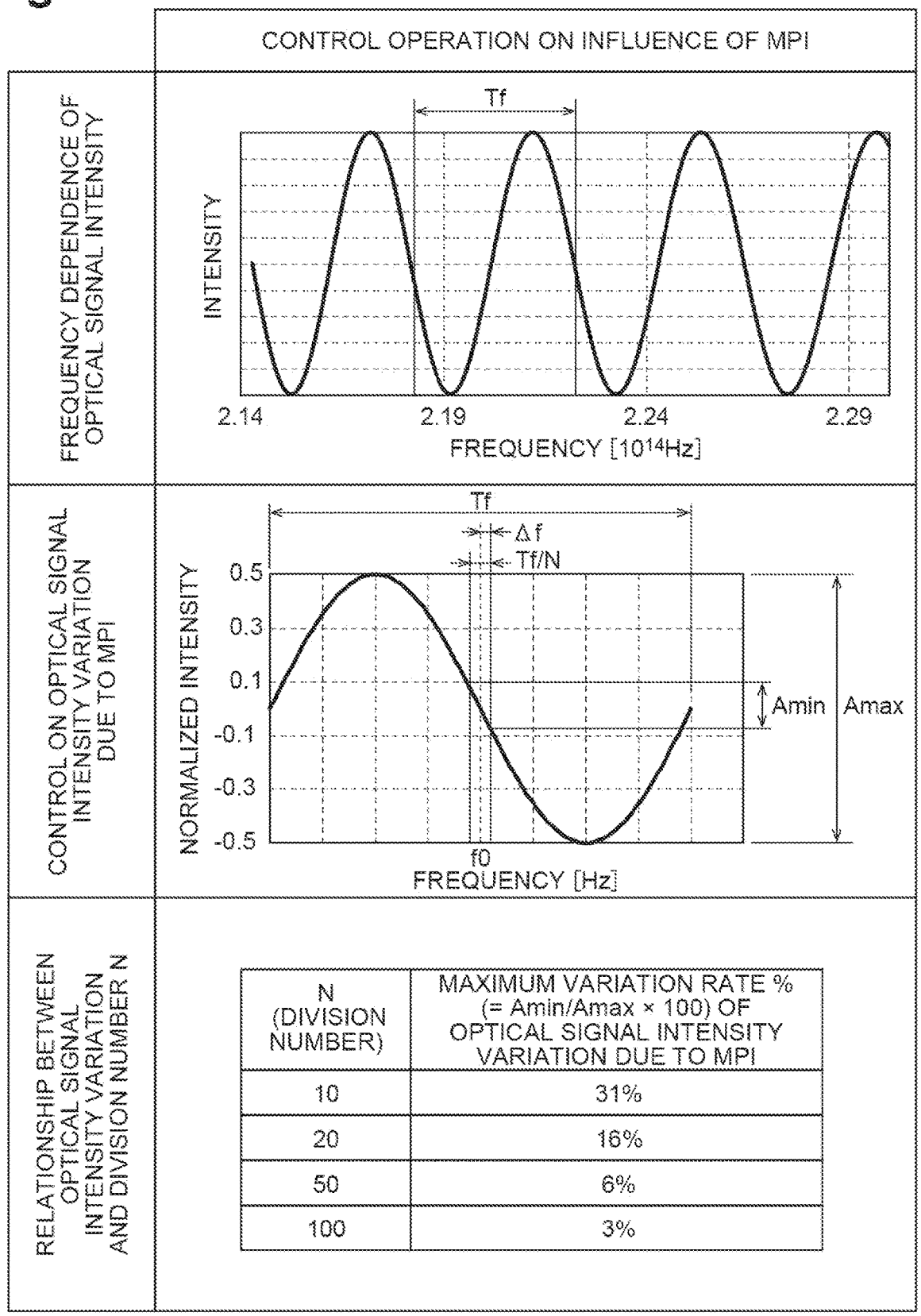
FIG. 3 is a diagram for describing a control operation of an optical signal intensity variation due to an MPI.

FIG. 3 is a diagram for describing a control operation of the optical signal intensity variation due to the MPI. The upper part of FIG. 3 illustrates a frequency dependence of the optical signal intensity due to the MPI, and this frequency characteristic is characterized by the vibration period Tf of the optical signal intensity due to MPI with respect to the optical frequency.

In the present disclosure, the influence of the interference modes (MPI) of the low-order mode and the high-order mode on the optical communication (modulation) system is quantified as the "variation rate of optical signal intensity variation" illustrated in the middle and lower parts of FIG. 3, and the condition that the "variation rate of optical signal intensity variation" due to the MPI does not cause a problem in the frequency band necessary at the time of signal modulation is defined as follows.

In the optical waveguide device having the waveguide length L [mm], between the group delay time difference between the low-order mode and the high-order mode, that is, the inter-mode group delay time difference $\Delta\beta1$ [s/nm] and the vibration period Tf [Hz] (the upper part of FIG. 3) with respect to the optical frequency of the frequency dependence of the optical signal intensity variation due to the MPI, the following first relational expression:

$$Tf[Hz]=1/(|\Delta\beta1|\cdot L)$$

is satisfied.

Here, the group delay time $\beta1$ of each mode is given by the following formula (1):

$$\begin{cases} \beta1 = \left[\dfrac{d\beta}{d\omega}\right]_{\omega=\omega0} \\ \omega0 = \left(\dfrac{2\pi}{\lambda0}\right)\cdot c \end{cases} \quad (1)$$

$\lambda0$: signal wavelength
c: velocity of light.

The group delay time given by the above formula (1) is a first-order differential value of a propagation constant $\beta$ at a center frequency $\omega0$ and is a reciprocal of a group velocity Vg.

In order to prevent the optical signal intensity variation due to the MPI from becoming noise at the time of signal modulation, the vibration period Tf [Hz] of the MPI with respect to the optical frequency needs to be sufficiently larger than the frequency band $2\Delta f$ necessary for the signal modulation ($\Delta f$ is a rate of the modulation rate, and is 25 [GHz] or more). Specifically, as illustrated in the middle part of FIG. 3, by modulating the vibration period Tf [Hz] within a frequency range obtained by dividing the vibration period Tf [Hz] by an integer N (setting the frequency band $2\Delta f$ necessary for modulation within Tf/N) and increasing the number N of divisions as illustrated in the lower part of FIG. 3, it is possible to arbitrarily suppress the variation rate of the optical signal intensity variation due to the MPI. In the middle part of FIG. 3, a vertical axis indicates a normalized intensity in which a variation range of the optical signal intensity is set to 1 (set maximum intensity to 0.5 and minimum intensity to −0.5). That is, the modulation rate $\Delta f$ is set, with respect to the vibration period Tf with respect to the optical frequency and the division number N thereof, so as to satisfy the following second relational expression:

$$2\times\Delta f[Hz]\leq Tf[Hz]/N.$$

This means that the influence of the MPI on the optical signal intensity variation is limited within a range of $(f_0-\Delta f)$ [Hz] or more and $(f_0+\Delta f)$ [Hz] or less centered on the frequency $f_0$. In other words, it means that the optical signal intensity variation of a maximum variation range $A_{max}$ is treated as the optical signal intensity variation of a variation range $A_{min}$.

For example, as illustrated in the lower part of FIG. 3, when the division number N is 10, the maximum variation rate of the optical signal intensity variation due to the MPI is 31%. When the division number N is 20, the maximum variation rate is 16%. When the division number N is 50, the maximum variation rate is 6%. When the division number N is 100, the maximum variation rate of the optical signal intensity variation due to the MPI is 3%.

Further, by substituting the first relational expression into the second relational expression, the following formula is obtained:

$$|\Delta\beta1|\leq 1/(N\cdot 2\Delta f\cdot L).$$

Note that "L" is a waveguide length, "$\Delta\beta1$" is an inter-mode group delay time difference, "N" is an integer value that divides the vibration period Tf with respect to the optical frequency and is a division number defined by any integer of 10 or more and 100 or less, and "$\Delta f$" is a modulation rate defined by any frequency (for example, $\Delta f=25$ [GHz] corresponds to 25 [GBaud]) of $25\times 10^9$ [Hz] or more and $1000\times 10^9$ [Hz] or less. In the optical waveguide device satisfying $|\Delta\beta1|\leq 2\times 10^{12}$ [s]/L, the division number can be set to 10 or more with respect to the signal of the modulation rate $\Delta f=25\times 10^9$ [Hz], and the intensity variation of the modulation signal can be suppressed to 31% or less with respect to the maximum optical signal intensity variation due to the MPI.

Figure 4:
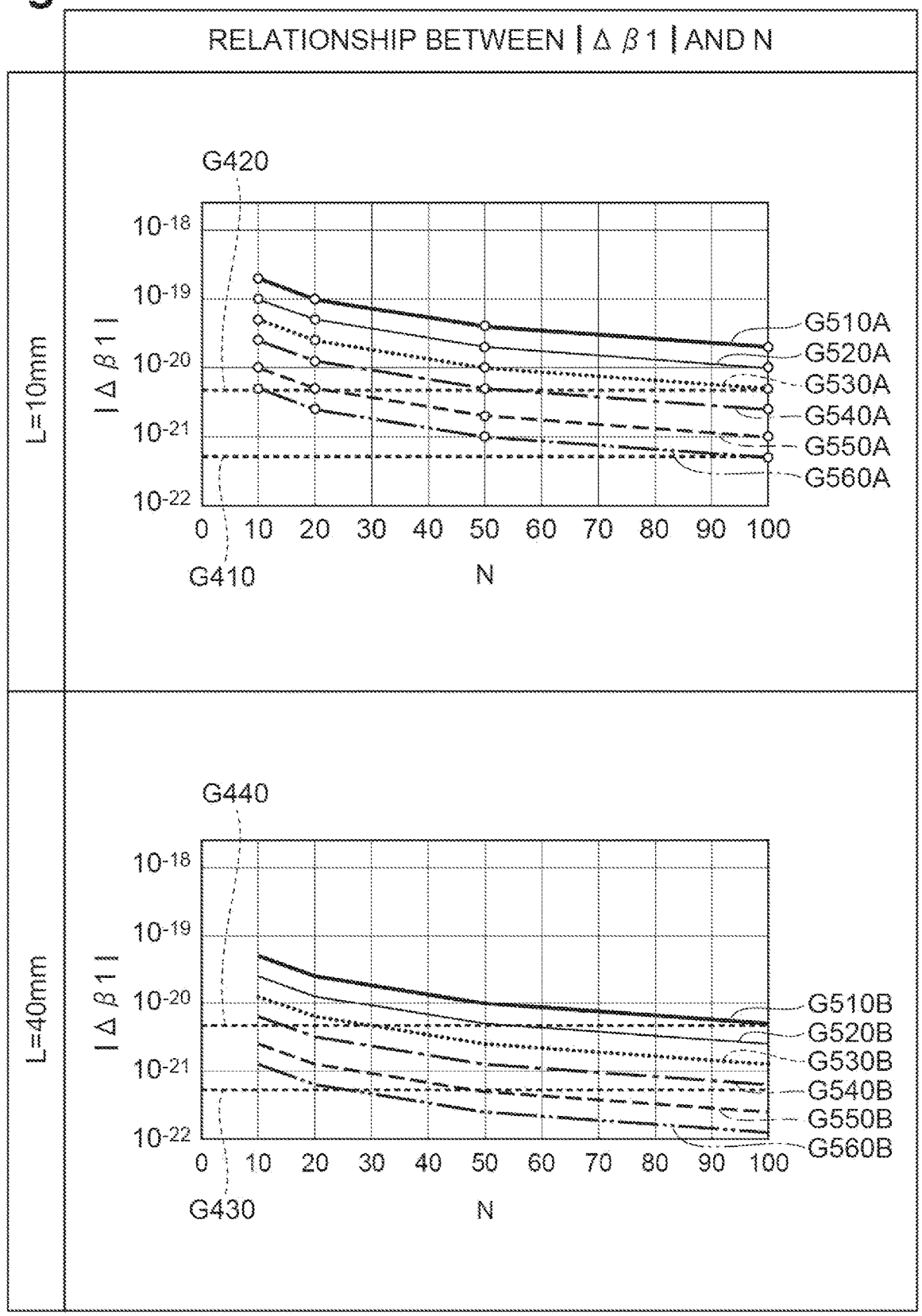
FIG. 4 is a graph illustrating a relationship between an inter-mode group delay time difference $\Delta\beta 1$ (absolute value) and a division number N for each of various modulation rates.

FIG. 4 is a graph illustrating a relationship between the inter-mode group delay time difference $\Delta\beta1$ (absolute value) and the division number N for each of the above-described various modulation rates. The prepared optical waveguide device is the FIFO device having a core having a refractive index profile of a step index (SI) type and having a rectangular cross section, as a waveguide, which allows a high-order mode. The upper part of FIG. 4 illustrates a relationship between $\Delta\beta1$ (absolute value) and the division number N in the optical waveguide device having a waveguide length L of 10 mm. The lower part of FIG. 4 illustrates a relationship between $\Delta\beta1$ (absolute value) and the division number N in the optical waveguide device having a waveguide length L of 40 mm.

Specifically, in the prepared FIFO device, the relative refractive index difference Δ of the core with respect to the cladding layer is 0.5% in Sample 1 (FIFO device as the embodiment of the present disclosure) and Comparative Example 1, and is 0.7% in Sample 2 (FIFO device as the embodiment of the present disclosure) and Comparative Example 2. The core widths of Sample 1 and Comparative Example 1 are 8 μm, and the core widths of Sample 2 and Comparative Example 2 are 8.5 μm. In all the prepared FIFO devices, a minimum core pitch is 35 μm and the curvature radius r of the bent portion provided in the core is 20 mm. In addition, the waveguide length L of the core is 10 mm (the upper part of FIG. 4) for Samples 1 and 2, and 40 mm (the lower part of FIG. 4) for Comparative Examples 1 and 2. The optical signal having a wavelength $\lambda 0=1310$ [nm] is inputted to the FIFO device.

Note that in the FIFO device having the above-described structure, the theoretical bending loss is approximately 0 dB/mm in all the prepared FIFO devices. The measured crosstalk is −40 dB or less in Sample 1 and Comparative Example 1, and −50 dB or less in Sample 2 and Comparative Example 2. Furthermore, regarding the inter-mode group delay time difference $\Delta\beta 1$, the group delay time $\Delta\beta 1$ of the low-order mode (fundamental mode) is $4.904\times 10^{-18}$ [s/nm] in Sample 1 and Comparative Example 1, and $4.914\times 10^{-18}$ [s/nm] in Sample 2 and Comparative Example 2. The group delay time $\beta 1$ of a highest-order mode for guiding in the waveguide is $4.905\times 10^{-18}$ [s/nm] (primary) in Sample 1 and Comparative Example 1, and $4.919\times 10^{-18}$ [s/nm](secondary) in Sample 2 and Comparative Example 2. At this time, the absolute value of the inter-mode group delay time difference $\Delta\beta 1$ is $5.211\times 10^{-22}$ [s/nm] $(=|(4.904-4.905)|\times 10^{-18})$ in Sample 1 and Comparative Example 1, and $4.717\times 10^{-21}$ [s/nm] $(=|(4.914-4.919)|\times 10^{-18})$ in Sample 2 and Comparative Example 2.

In the upper and lower parts of FIG. 4, a graph G510A and a graph G510B illustrate a relationship between a division number N and $\Delta\beta 1$ (absolute value) at a modulation rate $\Delta f=25$ [GHz], a graph G520A and a graph G520B illustrate a relationship between a division number N and $\Delta\beta 1$ (absolute value) at a modulation rate $\Delta f=50$ [GHz], a graph G530A and a graph G530B illustrate a relationship between a division number N and $\Delta\beta 1$ (absolute value) at a modulation rate $\Delta f=100$ [GHz], a graph G540A and a graph G540B illustrate a relationship between a division number N and $\Delta\beta 1$ (absolute value) at a modulation rate $\Delta f=200$ [GHz], a graph G550A and a graph G550B illustrate a relationship between a division number N and $\Delta\beta 1$ (absolute value) at a modulation rate $\Delta f=500$ [GHz], and a graph G560A and a graph G560B illustrate a relationship between a division number N and API (absolute value) at a modulation rate $\Delta f=1$ [THz]. In addition, a graph G410 illustrates a relationship between a division number N and $\Delta\beta 1$ (absolute value) for the FIFO device having the structure of Sample 1, and it can be confirmed that the formula: $|\Delta\beta 1|\leq 1/(N\cdot 2\Delta f\cdot L)$ is satisfied in all cases where the modulation rate $\Delta f$ is 25 [GHz] to 1 [THz]. A graph G420 illustrates a relationship between a division number N and $\Delta\beta 1$ (absolute value) for the FIFO device having the structure of Sample 2, and it can be confirmed that the formula: $|\Delta\beta 1|\leq 1/(N\cdot 2\Delta f\cdot L)$ is satisfied in a case where the modulation rate $\Delta f$ is 25 [GHz] to 100 [GHz]. On the other hand, in the FIFO device having the structure of Comparative Example 1 (graph G430) in which the waveguide length L exceeds 20 mm, the modulation rate $\Delta f$ is limited to 200 [GHz], and in the FIFO device having the structure of Comparative Example 2 (graph G440), the modulation rate $\Delta f$ is limited to 25 [GHz].

Note that the theoretical coupling loss between the coupled optical fiber and the FIFO device is less than 0.05 [dB] in Sample 1 and Comparative Example 1, and less than 0.08 [dB] in Sample 2 and Comparative Example 2.

As described above, according to the optical waveguide device of the present disclosure, the low bending loss, the low crosstalk, and the low coupling loss are achieved, and the inter-mode group delay time difference $\Delta\beta 1$ satisfies the formula: $\Delta\beta 1|\leq 1/(N\cdot 2\Delta f\cdot L)$. This indicates that the degradation of the optical signal due to the interference (MPI) between the low-order mode and the high-order mode is not significant. Therefore, there is no problem in the optical communication system of the present disclosure.

REFERENCE SIGNS LIST

10 TX (optical transmitter)
20 RX (optical receiver)
30 SCF (single-core optical fiber)
31 core
32 cladding
300 end surface
40 MCF (multi-core optical fiber)
41 core
42 common cladding
400 end surface
50 FIFO device
50A, 50B optical waveguide device (FIFO device)
50a first device end surface
50b second device end surface
51 core (waveguide)
51a first end surface (first waveguide end surface)
51b second end surface (second waveguide end surface)
52 cladding layer
55 bent portion

The invention claimed is:

1. A Fan-In Fan-Out (FIFO) device comprising:
a first device end surface;
a second device end surface opposing the first device end surface;
a waveguide that has a first waveguide end surface that matches the first device end surface and a second waveguide end surface that matches the second device end surface, and in which light beams of a plurality of modes having different orders are guided, and one or more bent portions are provided on an optical path from the first waveguide end surface to the second waveguide end surface; and
a cladding layer in which the waveguide is provided inside or on a surface, and has a refractive index lower than a refractive index of the waveguide,
wherein the waveguide has
a rectangular cross section,
a waveguide length L of $5\times 10^6$ [nm] or more and $100\times 10^6$ [nm] or less defined by an optical path length from the first waveguide end surface to the second waveguide end surface, and
a structure in which a group delay time difference $\Delta\beta 1$ between the plurality of modes satisfies a condition given by $|\Delta\beta 1|\leq 2\times 10^{-12}$ [s]/L.

2. A Fan-In Fan-Out (FIFO) device comprising:
a first device end surface;
a second device end surface opposing the first device end surface;
a waveguide that has a first waveguide end surface that matches the first device end surface and a second waveguide end surface that matches the second device end surface, and in which light beams of a plurality of modes having different orders are guided, and one or more bent portions are provided on an optical path from the first waveguide end surface to the second waveguide end surface; and a cladding layer in which the waveguide is provided inside or on a surface, and has a refractive index lower than a refractive index of the waveguide, wherein the waveguide has a rectangular cross section, a waveguide length L of $5\times10^6$ [nm] or more and $100\times10^6$ [nm] or less defined by an optical path length from the first waveguide end surface to the second waveguide end surface, and a structure in which a group delay time difference $\Delta\beta1$ between the plurality of modes satisfies a condition given by $|\Delta\beta1|\leq 1/(N\cdot 2\Delta f\cdot L)$ with respect to a division number N that is an integer value for dividing a vibration period Tf with respect to an optical frequency of an optical signal intensity variation due to an MPI between the plurality of modes and is defined by any integer of 10 or more and 100 or less and a modulation rate $\Delta f$ defined by any frequency of $25\times10^9$ [Hz] or more and $1000\times10^9$ [Hz] or less.

3. The FIFO device according to claim 2, wherein the waveguide length L is $20\times10^6$ [nm] or less.

4. The FIFO device according to claim 1, wherein the one or more bent portions have a curvature radius r of 40 mm or less.

5. An optical communication system comprising:
at least a pair of optical fibers having cores single-mode coupled to each other; and
the FIFO device according to claim 1 disposed between the pair of optical fibers.

6. The optical communication system according to claim 5, wherein each of the pair of optical fibers includes a single-core optical fiber or a multi-core optical fiber.

* * * * *